United States Patent [19]

Kreevoy et al.

[11] Patent Number: 4,661,257
[45] Date of Patent: Apr. 28, 1987

[54] LIQUID MEMBRANE SYSTEM FOR THE REMOVAL OF NITRATE FROM WATER

[75] Inventors: Maurice M. Kreevoy; Ann T. Kotchevar, both of Minneapolis, Minn.

[73] Assignee: Regents of the University of Minnesota, Minneapolis, Minn.

[21] Appl. No.: 711,391

[22] Filed: Mar. 13, 1985

[51] Int. Cl.$^4$ .................................................. C02F 1/26
[52] U.S. Cl. ...................................... 210/638; 210/643; 210/903; 210/321.1; 252/364; 423/DIG. 14
[58] Field of Search ............... 210/634, 638, 643, 644, 210/651, 654, 903, 321.1; 252/364; 423/8, DIG. 14; 564/80, 94, 280

[56] References Cited

U.S. PATENT DOCUMENTS

| Re. 30,125 | 10/1979 | Li et al. | 210/22 R |
|---|---|---|---|
| Re. 30,179 | 12/1979 | Li et al. | 210/22 R |
| 2,184,279 | 12/1939 | Christiansen | 564/80 |
| 3,393,194 | 7/1968 | Baravalle | 564/280 |
| 3,897,308 | 7/1975 | Li et al. | 195/63 |
| 3,966,594 | 6/1976 | Ohkawa et al. | 210/638 |
| 4,292,181 | 9/1981 | Li et al. | 210/638 |
| 4,400,296 | 8/1983 | Batzer et al. | 252/364 |
| 4,437,994 | 3/1984 | Baker | 210/630 |
| 4,461,709 | 7/1984 | Batzer et al. | 210/643 |

FOREIGN PATENT DOCUMENTS 2419730  11/1979  France ............................... 210/643
57024    3/1982   Israel .

OTHER PUBLICATIONS

M. M Kreevoy et al, Environmental Science & Technology, vol. 16, p. 635, (1982).
W. C. Babcock et al, Coupled Transport Membrane for Uranium Recovery, Int'l Solvent Extraction Conf., Liege, Belgium (1980).
W. C. Babcock et al, Int'l Solvent Extraction Conf. (Proc.), Denver, Colorado (1983), p. 373.

Primary Examiner—Peter Hruskoci
Attorney, Agent, or Firm—Merchant, Gould, Smith, Edell, Welter & Schmidt

[57] ABSTRACT

Quaternary ammonium salts are disclosed which are highly effective as complexing agents for the extraction of hydrogen ion and anions such as nitrate from an aqueous feed solution via a coupled ion transport mechanism employing supported liquid membranes.

14 Claims, 1 Drawing Figure

LIQUID MEMBRANE SYSTEM FOR THE REMOVAL OF NITRATE FROM WATER

BACKGROUND OF THE INVENTION

This invention was made with Government support under Grant No. NSF/CHE-8215014, awarded by the National Science Foundation. The Government has certain rights in this invention.

Excessive nitrate concentrations in drinking water resulting from agricultural and industrial activity, domestic sewage and automobile emissions, is a widespread and growing problem. One preliminary approach to the solution of this problem involves the extraction of nitrate from contaminated feed water and its transfer into a stripping solution. The extraction and stripping of the nitrate can be carried out by employing solid-supported liquid membranes. As an active phase these membranes employ water-immiscible complexing agents held by capillary forces within the voids of a porous polymeric support. When the membrane is placed between the feed water and the aqueous stripping solution, nitrate anions and counterions from the feed water are extracted into the membrane and diffuse across it as a neutral organic complex. Under suitable conditions, diffusion can occur "uphill", i.e. against the nitrate anion concentration gradient of the aqueous solutions. The energy for concentrating the nitrate anions is provided by the coupled transport of the counter-ion.

For example, Kreevoy and Nitsche, in *Environmental Science and Technology*, Vol. 16, 635 (1982), reduced the level of nitrate in an aqueous feed solution from 20 ppm to 4 ppm employing a supported solution of a mixture of secondary amines (Amberlite ® LA-2) in trioctyl phosphate as the liquid membrane. The coupled transport of nitrate was driven by the co-transport of hydrogen ions (H+) from the feed solution and their release into a stripping solution which was maintained at a higher pH than the feed solution. The mechanism of the transport reaction can be summarized as follows, wherein substances marked with an overbar are in the membrane solution:

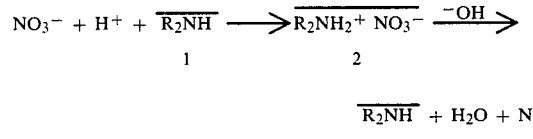

According to this co-transport mechanism, the amine complexing agent (1) in the membrane forms a complex (2) with H+ and the nitrate anions (NO3−) in the feed solution and this complex diffuses to the side of the membrane in contact with the stripping solution. At this interface, the complex dissociates because of the reduced concentration of hydrogen ion (H+), with the liberation of both nitrate and H+ into the stripping solution. The neutral amine complexing agent then diffuses back to the feed side of the membrane and the transport is repeated.

In *Coupled Transport Membranes for Uranium Recovery*, International Solvent Extraction Conference, Liege, Belgium, (Sept. 6–12, 1980) W. C. Babcock et al. disclose the use of a supported liquid membrane incorporating a solution of trioctyl amine in a hydrocarbon diluent for the removal of uranyl sulfate from aqueous solutions. R. W. Baker in U.S. Pat. No. 4,437,994 discloses a wide variety of amine complexing agents as useful for the selective extraction of metal ions from aqueous feed solutions by coupled transport. Such processes are disclosed to substantially eliminate problems associated with phase separation and solvent entrainment in the aqueous phase which are commonly associated with conventional solvent extraction procedures.

Although Kreevoy and Nitsche produced a liquid membrane which achieved a rate constant (k) of $6 \times 10^{-6}$ sec$^{-1}$ for nitrate transfer, the removal of nitrate was too slow for practical application to drinking water purification on a household or institutional scale.

The nitrate flux through any given liquid membrane system is dependent upon a number of variables. However, practical contraints such as the pH range of drinking water and the pH range attainable in useful stripping solutions render the selection of the organic complexing agent critical to the optimization of the performance of a given coupled transport membrane.

Therefore, a need exists for organic complexing agents which will more strongly bind hydrogen ion, and thus transport nitrate more effectively than the amine bases previously known to be useful for coupled cotransport in liquid membrane systems. A need also exists for organic complexing agents which exhibit low water-solubility and toxicity and are resistant to degradation by other substances which may be present in the feed and stripping solutions.

BRIEF DESCRIPTION OF THE INVENTION

The present invention is directed to improved complexing agents for use in coupled ion transport processes which employ supported liquid membranes. The present invention is also directed to processes for selectively removing anionic species from aqueous feedstocks by means of supported liquid membranes incorporating the complexing agents of the invention, as well as to liquid membranes and supported liquid membranes which incorporate these agents.

The complexing agents of the present invention can be generally described as quaternary ammonium salts of the structure $(R)_4N^+X^-$, wherein the ammonium cation is capable of forming an ion pair with the target anion and the counterion $X^-$ is designed to exhibit a high affinity for hydrogen ion (H+). These agents are highly effective in coupled ion transport processes in which the transport of the anionic species is driven by the co-transport of hydrogen ion. For example, when the target anion in the aqueous feed solution is nitrate and the counter ion is a phenolate (PhO−), the transport reaction can be summarized as follows, wherein substances marked with an overbar are in the liquid membrane phase:

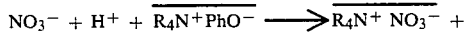

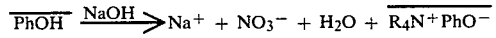

As compared with a neutral amine, the use of a basic quaternary ammonium salt results in a large increase in the concentration of the NO3−-containing species in the membrane which, in turn, increases the nitrate flux through the liquid membrane.

When dissolved in a suitable water-immiscible solvent, the present complexing agents can be introduced into the pores of a polymeric support, e.g. a film or hollow fiber. The resultant supported liquid membranes can be used in commercially-available dialysis-type cells or modules to transport target organic and inorganic anionic species from aqueous feed solutions into aqueous stripping solutions. Typical applications of the process of the present invention can include the purification of drinking water, the isolation of metals from hydrometallurgical leach solutions and plating baths, and the like.

The foregoing and other advantages are attained by the invention, as will be apparent from the following detailed description, which is to be taken in conjunction with the accompanying drawings, wherein:

FIG. 1 is a schematic cross-sectional view of an apparatus suitable for practicing the invention, including a module provided with a multiplicity of hollow fibers used in circulating the aqueous feed solution.

DETAILED DESCRIPTION OF THE INVENTION

Complexing Agent

Figure 1:
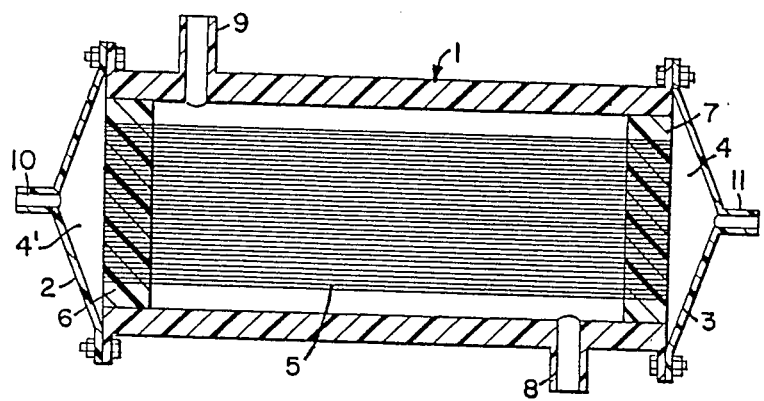

The complexing agents of the present invention are intended for use in coupled ion co-transport processes employing supported liquid membranes. The complexing agent is a quaternary ammonium salt of the formula:

$[(R_1)(R_2)(R_3)(R_4)N^+]X^-$, wherein $R_1$, $R_2$, $R_3$ and $R_4$ are alkyl or cycloalkyl, N being substituted by a total number of carbon atoms between about 15-60 and wherein $X^-$ is an aromatic anion of the formula:

$ArO^-$ or $ArSO_2N^--Z$ wherein Ar is of the formula:

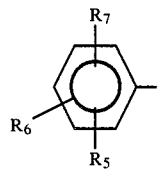

wherein $R_5$ and $R_6$ are H or $C_1$–$C_5$ alkyl and $R_7$ is H or $C_1$–$C_{12}$ alkyl and Z is $R_7$ or $CH_2Ar$, and wherein $X^-$ comprises at least 9 carbon atoms.

These complexing agents can be prepared from readily-available starting materials by synthetic methods well known to the art. For example, the preparation of phenolate salts of quaternary amines can be accomplished by contacting a water-immiscible solution of the quaternary ammonium chloride and an equimolar amount of the corresponding phenol (ArOH) in an organic solvent with an equimolar amount of aqueous sodium hydroxide. The resulting phenolate salt can be isolated from the organic phase. Arylsulfonamides of primary amines can be prepared by the reaction of the corresponding arylsulfonyl chloride with the corresponding benzyl or alkyl amine. The sulfonamide can then replace the phenol in the above-described salt-forming reaction with aqueous base, to afford the resulting amidate.

The substituents present on the nitrogen atom of the ammonium cation and on the aromatic counterion are preferably selected so that the complexing agent exhibits low solubility in both the aqueous feed solution and the aqueous stripping solution, loads readily with the desired anion and $H^+$, and readily releases the desired anion and $H^+$ into the stripping solution. Complexing agents intended for use in drinking water purification should also exhibit low toxicity levels, and must not impart an undesirable odor or taste to the water to the extent they are eluted therein. The substituents on the aromatic counterion also should not impart significant surfactant properties to the counterion when it is in the neutral phenol or amine form, in order to minimize dispersal of the liquid membrane into the aqueous phases. It has been found preferable to employ complexing agents which exhibit pKa's equal to about 10–12 in aqueous solution. Complexing agents exhibiting pKa's substantially below about 10 do not become effectively loaded from the feed solution, while agents exhibited pKa's above about 12 fail to regenerate the unloaded, or anion-free form, when contacted with the stripping solution.

Although $R_1$, $R_2$, $R_3$ and $R_4$ may individually be selected from a wide variety of aliphatic and cycloalkyl moieties, it is preferable that the total number of carbon atoms in all of the alkyl groups covalently bound to the nitrogen atom of the ammonium cation be about 16–48, e.g. the four substituents are individually $C_4$–$C_{12}$-alkyl. Most preferably, one of the substituents will be a methyl group and the remaining three substituents will individually be $C_8$–$C_{10}$-alkyl groups.

Of the phenolate anions of general structure $ArO^-$, wherein Ar is as hereinabove defined, the trialkyl-substituted phenolates are preferred, e.g. wherein $R_5$, $R_6$ and $R_7$ are individually $C_1$–$C_4$ alkyl groups, e.g. a 2,4,6-trialkyl phenolate anion such as 2,4,6-trimethylphenolate. The amidate counterions of the general structure $ArSO_2N^--Z$, wherein Ar and Z are as defined hereinabove, have also been found effective in the present invention.

Liquid Carrier

Although some of the complexing agents described hereinabove may exist as liquids, and thus may not require a liquid carrier in order to permeate a porous polymeric support, it is generally preferable to dissolve the complexing agents in an organic liquid carrier which also is chemically-compatible with, and functions as a solvent for the anion/$H^+$-loaded complexing agent.

Such solvents are selected to increase the amount of nitrate or other target anion which is extracted from the feed solution and the diffusion rate of the anion/$H^+$ complex through the liquid membrane. Of course, it is preferred that the carrier be insoluble or only slightly soluble in water, and be compatible with the support and any species present in the aqueous phases. Although a wide variety of aliphatic and aromatic hydrocarbons can be employed as the liquid carrier phase, e.g. xylene, toluene, kerosene, mineral spirits and the like, it has been found highly preferable to employ a strong hydrogen bond acceptor as the carrier solvent. Useful solvents of this type include the liquid trialkylphosphates such as the tri-$C_4$-$C_{10}$-n-alkyl phosphates. For example, tri-n-octyl phosphate is a good solvent for the complexing agents of the present invention and said solutions exhibit a high oil-water distribution constant ($K_{o/a}$) for nitrate.

The Supported Membrane

In the practice of the present invention, the complexing agent is dissolved in the carrier solvent to the desired concentration, e.g. to about 0.5–1.5 M, and the resultant liquid membrane used to impregnate a porous polymeric support, such as a film or hollow fiber. Since the support material and the liquid membrane are both relatively hydrophobic, the pores can be substantially completely filled with the liquid membrane by simple dipping and/or soaking procedures, which may be carried out in vacuo to enhance the removal of air from the voids present in the support material.

The porous support material is preferably made of a polymeric resin such as polyethylene, polypropylene, polytetrafluoroethylene, polyphenylene oxide, polybutylene, polystyrene, polyvinylchloride, acrylonitrile-butadienestyrene terpolymer, styrene-acrylonitrile copolymer, styrenebutadiene copolymer, polysulfone, poly(4-metyl-pentene-1), polyvinylidene chloride and chlorinated polyethylene. Preferably the porosity of such materials will be about 20–80%.

The function of the polymeric support is to prevent the mixing of the feed solution and the strippant, and to maintain a thin film of the active liquid membrane between them. Preferred porous polymeric films include microporous polypropylene film (e.g. Celgard ® 2400, 1.0 mil thick, 40% void volume, pores $1 \times 10^{-5} \times 2 \times 10^{-6}$ cm) and the polytetrafluoroethylene film commercially-available as Gore-Tex ® (W. L. Gore & Associates, 3.2 mils thick, 45% void volume, effective pore diameter $2 \times 10^{-6}$ cm).

When a hollow polymeric fiber is employed as the liquid membrane support, it preferably will have an inner diameter of about 5–100 mils, a wall thickness of about 2–20 mils, and an average pore diameter of about $1 \times 10^{-3}$ cm to $1 \times 10^{-5}$ cm.

The Anion Removal Process

In the practice of the present invention, an aqueous feed solution is employed which incorporates the anion or anions sought to be reduced in concentration and/or isolated. The aqueous stripping solution can incorporate an amount of a dissolved base effective to raise the pH of the stripping solution to about 11–13, about 5–7 units above the pH of the feed solution. Although a pH difference between the opposed solutions of about 1–2 units is adequate for some extractions, this higher hydrogen ion gradient is desirable, since the thermodynamic driving force for the co-transport process is provided by the transfer of $H^+$ to a solution where its concentration is substantially lower than that in the water from which it is being extracted.

The supported membrane separates compartments containing the feed and stripping solutions, which are preferably agitated and circulated from appropriately-sized reservoirs. So positioned, the supported membrane and the two compartments form a dialysis-type cell, in which the liquid membrane facilitates the passage of the $H^+$ and an anion, but inhibits the passage of water and all cations other than $H^+$, so that the anion diffuses through the membrane with the $H^+$ to maintain electrical neutrality. For example, nitrate is preferentially transferred along with the hydrogen ion rather than other ions (chloride, sulfate, bicarbonate and the like) because nitrate is the least hydrophilic of the ions commonly present in domestic water.

After diffusing to the strippant-membrane interface, the anion-complex dissociates, releasing the anion and the hydrogen ion into the stripping solution. Metal values can be recovered from their anionic complexes by conventional methods such as electroplating or precipitation. Contaminants such as nitrate, phosphate and the like which are accumulated in the strippant can be disposed of appropriately when their concentration attains the desired level.

The invention will be further described by reference to the following detailed Examples.

EXAMPLE 1

Preparation of Methyl(Tricaprylyl) Ammonium (2,4,6-Trimethyl)Phenate (MTAP)

A solution of 10.0 g of Methyl(tricaprylyl) ammonium chloride (Henkel Corporation, Aliquat ® 336, a 1:1 mixture of $CH_3(n-C_8H_{17})_3 N^+Cl^-$ and $CH_3(n-C_{10}H_{21})_3N^+Cl^-$), and 3.0 g of (2,4,6-trimethyl)phenol (Aldrich Chemical Co.) in 25.0 ml of dichloromethane was shaken four times with individual 60 ml portions of 0.5 M aqueous sodium hydroxide and once with water. The organic layer was isolated, dried over anhydrous magnesium sulfate and the solvent evaporated in vacuo to yield 4.0 g of methyl(tricaprylyl) ammonium (2,4,6-trimethyl) phenate, which was used without further purification.

EXAMPLE 2

Preparation of Methyl(Tricaprylyl) Ammonium N−Benzyl-p-toluenesulfonamidate (MTAS)

A solution of 20.0 g p-toluenesufonyl chloride in 50 ml dry pyridine was added dropwise to a stirred solution of 10.0 g benzyl amide in 50.0 ml dry pyridine. Stirring was discontinued, and after 1.0 hr, 50 ml portions of water and dichloromethane were added. The organic layer was separated and extracted with 10% aqueous hydrochloric acid. The dichloromethane was evaporated in vacuo and N-benzyl-p-toluene-sulfonamidate recrystallized from ethanol-water (m.p. 112.5°–114° C.).

Methyl(tricaprylyl) ammonium chloride and the amide were reacted to yield MTAS following the procedure of Example 1.

EXAMPLE 3

Supported Liquid Membrane Preparation

A 4 cm × 4 cm square of porous polypropylene film (Celgard ® 2400, Celanese Corp., $2.5 \times 10^{-3}$ cm thick) was placed in a flask and the flask evacuated to 0.2 torr. A 0.8 M solution of MTAP in trioctylphosphate (Alfa Products) was introduced into the flask until the film was immersed. After a 0.5 hour contact time, the vacuum was released, and the film allowed to soak in the MTAP solution for 14 hours. The impregnated film was removed from the solution and blotted prior to its insertion into the modified dialysis cell.

A 0.8 M solution of MTAS in trioctyl phosphate was employed to form a supported liquid membrane by the same procedure.

EXAMPLE 4

Nitrate Flux Through MTAP Membrane Employing Aqueous Sodium Hydroxide Stripping Solutions A supported liquid MTAP membrane prepared according to Example 3 was installed in the modified dialysis cell described in Kreevoy and Nitsche, *Environmental Science and Technology*, Vol. 16, 635 (1982), the disclosure of which is incorporated by reference herein. The cell consisted of a contact compartment for the nitrate feed solution and a contact compartment for the stripping solution which were separated by the supported liquid membrane. The exposed membrane surface was 6.5 cm² and each contact compartment held about 0.625 ml of solution which was dispersed in situ by a Vexar ® static mixer and pumped through the cell compartment in countercurrent fashion by a single Masterflex Cole-Parmer pump. The feed solution was $1.0 \times 10^{-3}$ M aqueous sodium nitrate adjusted to pH 7.3 with dilute phosphate buffer. The stripping solution was also adjusted to an initial concentration of $1.0 \times 10^{-3}$ M nitrate, and the concentration of sodium hydroxide set at 0.1 M (pH=13). Each solution was recycled from a 100 ml reservoir at a pump rate of 2.55 ml/sec.

Nitrate was monitored by withdrawing samples of feed solution at 0.5 hr intervals for at least 9.0 hr and determining their optical absorbance at 228 nm via a Beckman DU Spectrophotometer modified with a Gilford model 252 source, detector and amplifier. The observed rate constant of nitrate flux [k (sec$^{-1}$)] was determined from the slope of the plot of the natural logarithm of the absorbance versus operating time in minutes. The time course of the nitrate-related absorbance A in the feed solution can be represented by the formula:

$$k = [\ln(A_o/A_t)]/(t - t_o)$$

wherein the time of sampling is t and the subscript zero indicates a value pertaining to the initial conditions. The initial nitrate flux through the membrane was determined by multiplying kv/a by the initial molar nitrate concentration in the feed solution. The volume of the feed reservoir (in liters) is v and the exposed area of the membrane is a (6.5 cm²). Table I summarizes the results observed for 14 different pumping rates.

TABLE I

| Variation in Pumping Rate* | | |
|---|---|---|
| Pumping Rate (ml/sec) | Flux $\frac{(\text{moles NO}_3^- \times 10^{10})}{\text{cm}^2 \text{ sec}}$ | $k \times 10^5$ (sec$^{-1}$) |
| 0 | 0 | 0 |
| 0.055 | 1.35 | 0.85 |
| 0.11 | 1.93 | 1.22 |
| 0.18 | 1.96 | 1.24 |
| 0.19 | 1.88 | 1.19 |
| 0.51 | 2.29 | 1.49 |
| 0.81 | 2.56 | 1.61 |
| 1.25** | 2.29 | 1.52 |
| 2.29 | 2.49 | 1.62 |
| 2.46+ | 2.96 | 1.74 |
| 2.55 | 2.61 | 1.70 |
| 2.67 | 2.59 | 1.68 |
| 3.04 | 2.76 | 1.80 |
| 3.13 | 2.24 | 1.45 |
| 3.43 | 2.84 | 1.79 |

*Initial nitrate concentration - $1.0 \times 10^{-3}$ M; pH of loading solution - 7.3.
**Two runs (avg.)
+Three runs (avg.)

From the data summarized in Table I, it can be observed that the use of the MTAP carrier resulted in an increase in nitrate flux of up to 4 times that observed for a similar system employing Amberlite ® LA-2 as the carrier species. In spite of the fact that the experiments with MTAP were carried out with a feed solution pH of 7.3, while those using LA-2 employed a feed solution of 6.1, the use of the MTAP feed solution in the LA-2 runs would have resulted in a reduction in nitrate flux in the LA-2 runs by a factor of about 10.

An increase in pump rate of above about 2-3 ml/sec (7.0-10 l/hr) does not substantially increase the efficiency of nitrate transport, particularly in view of the increased energy requirements and equipment stress required by such parameters.

Table II summarizes the results observed for seven different sodium hydroxide concentrations in the stripping solution when the system of Example 4 was operated at a pumping rate of 2.55 ml/sec with a reservoir of 5.0 l of stripping solution.

TABLE II

| Variation in Base Concentration | | |
|---|---|---|
| Stripping Solution (M NaOH) | Flux $\frac{(\text{Mole NO}_3^- \times 10^{10})}{\text{cm}^2 \text{ sec}}$ | $k \times 10^5$ (sec$^{-1}$) |
| 0.01 | 2.43 | 1.58 |
| 0.03 | 2.03 | 1.32 |
| 0.05 | 1.97 | 1.28 |
| 0.10 | 2.72 | 1.77 |
| 0.3 | 2.91 | 1.89 |
| 0.5+ | 2.40 | 1.56 |
| 1.0+ | 2.91 | 1.91 |

+Two runs.

The data summarized on Table II indicate that the nitrate flux rate is generally increased by increasing the concentration of base in the stripping solution. However, there is a point above which an increased sodium hydroxide concentration level does not further increase the nitrate flux rate.

Employing 5.0 l reservoirs of 0.01 and 0.5 M sodium carbonate in place of the sodium hydroxide strippant in the system of Example 4 yielded initial nitrate fluxes of $1.24 \times 10^{-10}$ moles/cm² sec and $1.78 \times 10^{-10}$ moles/cm² sec, respectively (2.55 ml/sec pump rate).

Due to increased chemical stress on the membrane and other system equipment, the preferred sodium hydroxide concentration in the strippant solution is preferably adjusted to about 0.1-0.5M. The strippant concentration of the less corrosive sodium carbonate is preferably adjusted so as to optimize the nitrate flux, e.g. to about 0.25-0.75 M or higher, as required.

Conversion of the rate constant k(sec$^{-1}$) to the rate constant per unit cell length [k(cm$^{-1}$)] can be accomplished by means of the following formula:

$$k(\text{cm}^{-1}) = k(\text{sec}^{-1}) \times \frac{\text{reservoir volume}}{\text{cell volume}} \times \frac{1}{\text{feed velocity (cm/sec)}}$$

Employing the Table II value of $k = 1.77 \times 10^{-5}$ sec$^{-1}$ yields a k(cm$^{-1}$) of $2.8 \times 10^{-4}$ cm$^{-1}$ and permits the estimation that a single pass through a 25 m cell at a 2.5 ml/sec pump rate would afford a 50% reduction in the initial nitrate concentration of the feed solution.

EXAMPLE 5

Nitrate Flux Through MTAS Membrane

A supported liquid membrane prepared according to claim 3 employing a 0.8 M solution of MTAS in trioctylphosphate was installed in the dialysis cell as described in Example 4, employing 100 ml of $10^{-3}$ M sodium nitrate in phosphate buffer (pH=7.3) as the feed solution and 5.0 l of $10^{-3}$ M sodium nitrate in 0.1 M NaOH as the stripping solution. The solutions were pumped through the cell compartments in countercurrent fashion at 2.55 ml/sec. The absorbance of the feed solution was measured at 30 min intervals at 232 nm. The observed rate constant $k(\text{sec}^{-1})$ was $7.5 \times 10^{-6}$ and the nitrate flux was $1.15 \times 10^{-10}$ moles/cm$^2$ sec.

The data summarized in Example 4 permits the estimation that a 90% reduction in nitrate level can be achieved when the feed and stripping solutions are contacted with the liquid membrane at a rate of about 8 liters per hour per square meter of membrane surface. Although the rate of nitrate extraction employing the MTAS membrane (Ex. 5) was only about 25% the flux achieved employing the MTAP membranes, it is expected that the extraction efficiency can be increased by appropriate adjustments in the structural parameters of the anion of the complexing agent.

The supported liquid membranes of the present invention can be employed in hollow fiber membrane modules, such as are commercially available from Bend Research, Inc., Bend, Ore., and which are generally described in U.S. Pat. No. 4,437,944, the disclosure of which is incorporated by reference herein.

An apparatus suitable for practicing the invention is illustrated schematically in FIG. 1. Referring to FIG. 1, a module is shown which includes an elongate cylindrical casing 1 closed adjacent its ends by plugs 6 and 7. The support membrane system in the module takes the form of elongate fibers 5 extending between plugs 6 and 7, with the lumens or interiors of these fibers communicating through the plugs with spaces 4 and 4'. Stripping solution is circulated through the casing and over the outside of such fibers using ports 8 and 9 for introducing and exhausting the product solution. Caps 2 and 3 close off the ends of the casing outwardly of the plugs, and feed solution may be circulated through the module utilizing ports 10 and 11 communicating with spaces 4 and 4' which communicate with the interiors of the fibers, as described.

A unit having about 10 m$^2$ of hollow fiber surface area in a casing about 1 m long and 15 cm in diameter could decontaminate about 80–150 l of water containing about 20 ppm of nitrate, per hour when equipped with the present liquid membranes, and employing concentrated aqueous sodium carbonate in the stripping solution.

In addition to nitrate, an apparatus of this type would be expected to remove anionic detergents, humic acid and many other organic materials that might be present in the water at trace levels. The supported liquid membranes of the present invention would also be expected to remove relatively non-hydrophillic metal-containing anionic species from the feed water, such as uranyl sulfate, chromate and cyanated metal ions.

The invention has been described with reference to various specific and preferred embodiments and techniques. However, it should be understood that many variations and modifications may be made while remaining within the spirit and scope of the invention.

What is claimed is:

1. A process for the extraction of selected anions from an aqueous feed solution and deposition of said anions in an aqueous stripping solution comprising:
   (a) circulating said feed solution through a first compartment so that it contacts one side of a porous support, said support incorporating in a water-immiscible organic liquid a solution of a complexing agent selective for said anions, said solution substantially completely filling, and retained within the pores of said support, where said complexing agent is a quaternary ammonium salt of the formula:

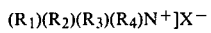

$(R_1)(R_2)(R_3)(R_4)N^+]X^-$ wherein $R_1$, $R_2$, $R_3$ and $R_4$ are alkyl or cycloalkyl, N being substituted by a total number of carbon atoms between about 15–60 and wherein $X^-$ is an aromatic anion of the formula:

$ArO^-$ or $ArSO_2N^-—Z$ wherein Ar is of the formula:

wherein $R_5$ and $R_6$ are H or $C_1$–$C_5$ alkyl, $R_7$ is H or $C_1$–$C_{12}$ alkyl and Z is $R_7$ or $CH_2Ar$, and wherein $X^-$ comprises at least 9 carbon atoms wherein said complexing agent exhibits a pKa of about 10–12 in aqueous solution, to form a complex comprising said complexing agent, hydrogen ions, and said anions in the feed solution;
   (b) diffusing said complex through the organic liquid to the opposide side of the support; and
   (c) circulating said aqueous stripping solution through a second compartment, wherein said aqueous stripping solution is maintained at a higher pH than said aqueous feed solution, so that the stripping solution contacts the opposite side of the support to liberate hydrogen ions and said anions into the stripping solution.

2. The process of claim 1 wherein said first compartment is defined by the lumens of a multiplicity of hollow fibers, the walls of said fibers forming said porous support.

3. The process of claim 1 wherein said selected anions comprise nitrate anions.

4. The process of claim 1 wherein $X^-$ comprises a 2,4,6-trialkylphenolate anion.

5. The process of claim 4 wherein $X^-$ comprises a 2,4,6-trimethyl-phenolate anion.

6. The process of claim 1 wherein $X^-$ comprises N-benzyl-p-toluenesulfonamidate.

7. The process of claim 1 wherein said porous support consists essentially of polybutylene, polyethylene, polypropylene, polysulfone, polytetrafluoroethylene or polyphenylene oxide.

8. The process of claim 1 wherein said organic liquid comprises a trialkylphospate.

9. The process of claim 8 wherein the trialkylphosphate comprises trioctylphosphate.

10. The process of claim 1 wherein said aqueous stripping solution comprises sodium carbonate or sodium hydroxide.

11. A supported liquid membrane for use in coupled ion transport processes comprising a porous support incorporating a solution of a complexing agent in a water-immiscible organic liquid, wherein said solution is retained by, and substantially completely fills the pores of said support, and wherein said complexing agent is of the formula:

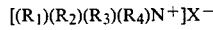

$[(R_1)(R_2)(R_3)(R_4)N^+]X^-$ wherein $R_1$, $R_2$, $R_3$ and $R_4$ are alkyl or cycloalkyl, N being substituted by a total number of carbon atoms between about 15–60 and wherein $X^-$ is an aromatic anion of the formula:

$$ArO^- \text{ or } ArSO_2N^- —Z$$

wherein Ar is of the formula:

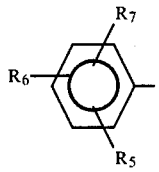

wherein $R_5$ and $R_6$ are H or $C_1$–$C_5$ alkyl and $R_7$ is H or $C_1$–$C_{12}$ alkyl and Z is $R_7$ or $CH_2Ar$, and wherein $X^-$ comprises at least 9 carbon atoms, and wherein said complexing agent exhibits a pka of about 10–12 in aqueous solution.

12. The supported liquid membrane of claim 11 wherein the porous support consists essentially of polybutylene, polyethylene, polypropylene, polysulfone, polytetrafluoroethylene or polyphenylene oxide.

13. The supported liquid membrane of claim 11 wherein the organic liquid comprises a tri-n-alkylphosphate.

14. The supported liquid membrane of claim 13 wherein the organic liquid comprises tri-octyl-phosphate.

* * * * *